W. H. CRICHTON.
Grain-Drill.
No. 45,817. Patented Jan. 10, 1865.
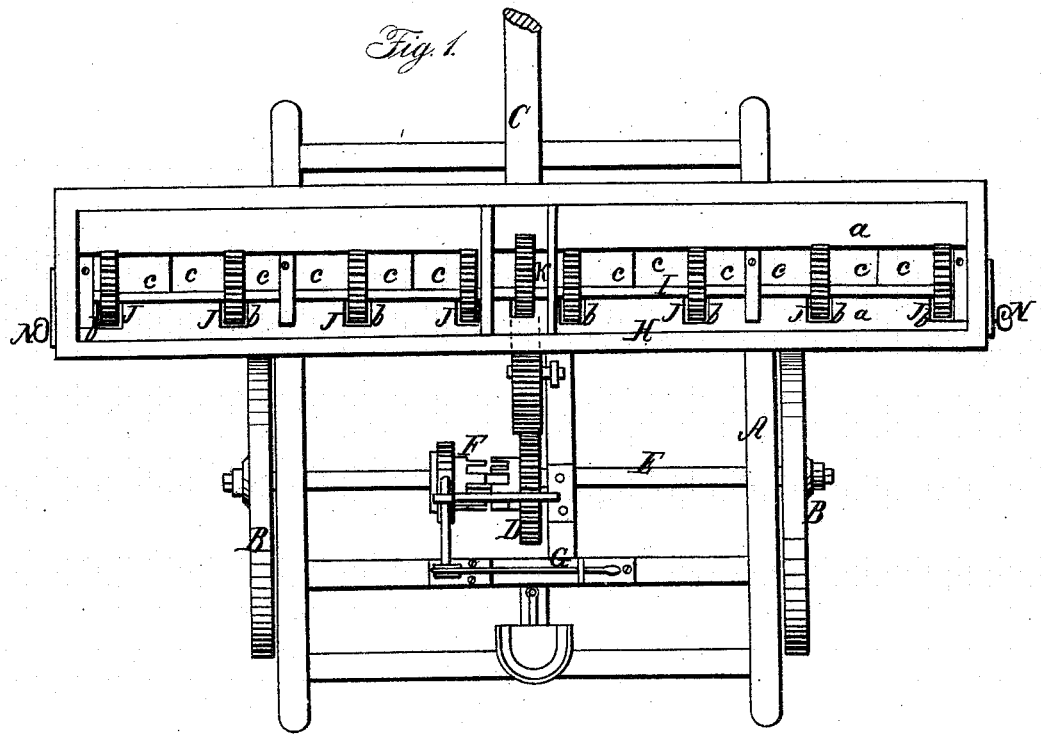
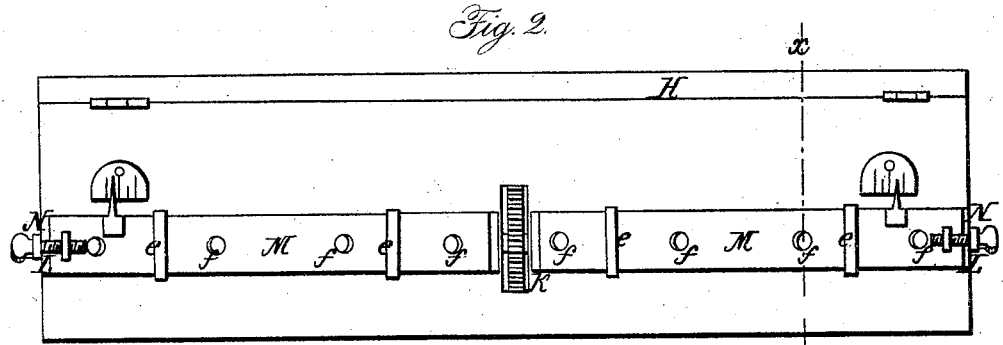
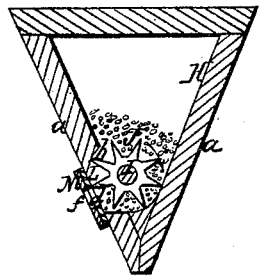
Witnesses:
Inventor:

UNITED STATES PATENT OFFICE.

W. H. CRICHTON, OF LA PORTE, INDIANA.

IMPROVEMENT IN SEEDING-MACHINES.

Specification forming part of Letters Patent No. 45,817, dated January 10, 1865.

*To all whom it may concern:*

Be it known that I, W. H. CRICHTON, of La Porte, in the county of La Porte and State of Indiana, have invented a new and Improved Broadcast-Seeding Machine; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig 2, a rear view of the seed-box; Fig. 3, a transverse vertical section of the same, taken in the line $x$ $x$, Fig. 2.

Similar letters of reference indicate like parts.

This invention relates to a new and improved broadcast-seeding machine; and it consists in a new and improved means employed for discharging the seed and graduating its discharge, as hereinafter fully shown and described, whereby a greater or less quantity of seed may be sown on a given area, as required, and the seed sown in an even or uniform manner, the machine at the same time being capable of sowing all kinds of seed of less size than Indian corn.

A represents a rectangular frame, which is mounted on two wheels, B B, and has a draft-pole, C, attached to it.

D is a wheel, which is placed loosely on the axle E of the wheels B B, and is connected with the axle E, when required, by means of a clutch, F, operated by a lever, G. (See Fig. 1.)

H represents a seed-box, which is placed on the frame A, and is of oblong form, having inclined front and rear sides, $a$ $a$, as shown in Fig. 3. This seed-box projects beyond the sides of the frame A, and it has a shaft, I, placed longitudinally in it, on which a series of wheels, J, are keyed at suitable and equal distances apart. These wheels J are of pointed form, as shown in Fig. 3, the space between the points or projections forming seed-cells. The rear parts of these wheels work in recesses $b$ in the rear side, $a$, of the seed-box H, as shown in Fig. 3, and at the bottom of the seed-box, between the wheels J, there are double-inclined planes $c$ $c$, which have a tendency to throw the seed underneath the wheels J.

The shaft I is rotated from the axle E by means of a wheel, K, which gears into the wheel D, the shaft I being rendered inoperative, when desired, by disconnecting the wheel D from the axle E through the medium of the clutch F.

The rear side of the seed-box H is perforated with holes, which are opposite the wheels J, and these holes are covered by plates L L, also perforated with holes $d$. The plates L L are covered by plates M M, which are fitted in guides $e$, and are adjusted by screws N. The plates M are also perforated with holes $f$, and by adjusting the plates M the holes $f$ in the latter may be made to register wholly or partially with the holes $d$ in the fixed or stationary plates L L. As the machine is drawn along the wheels J are rotated in the direction indicated by the arrows, and the seed is discharged through the holes $d$ $f$ in the plates L M, and in greater or less quantities, according to the adjustment of the plates M M.

I claim as new and desire to secure by Letters Patent—

The rotating pointed wheels J, fitted on a shaft, I, within the seed-box H, with double-inclined planes $c$ $c$ between them, and the wheels working in recesses $b$ in the rear side of the seed-box, in combination with the fixed perforated plate L and the adjustable perforated plate M at the rear of the seed-box, all arranged substantially as and for the purpose set forth.

W. H. CRICHTON.

Witnesses:
JOHN MILLIKEN,
JAMES LOWER.